United States Patent [19]

Young

[11] 4,309,964
[45] Jan. 12, 1982

[54] MACHINE FOR CRUTCHING SHEEP AND OTHER ASSOCIATED VETERINARY PURPOSES

[76] Inventor: Henry S. C. Young, Box 108, Keith, Australia, 5267

[21] Appl. No.: 172,415

[22] Filed: Jul. 25, 1980

[51] Int. Cl.³ ............................................... A61D 3/00
[52] U.S. Cl. ..................................................... 119/103
[58] Field of Search ............................ 119/103, 98, 99

[56] References Cited
U.S. PATENT DOCUMENTS
4,031,858 6/1977 Harrington ......................... 119/103

FOREIGN PATENT DOCUMENTS
212637 8/1957 Australia ............................... 119/98

*Primary Examiner*—Hugh R. Chamblee
*Attorney, Agent, or Firm*—Harlan P. Huebner

[57] ABSTRACT

A machine for crutching sheep and for other veterinary purposes in which a sheep is moved into a race and is discharged into a cradle characterized by a longitudinally hinged race platform adapted to tip a sheep over a roll plate on to a ramp disposed between the race platform and the cradle, the platform being coupled to the race platform to move to a lesser angle as the race platform tilts but increases in angle as the weight of the sheep is removed from the race platform whereby to further roll the sheep into the cradle.

10 Claims, 7 Drawing Figures

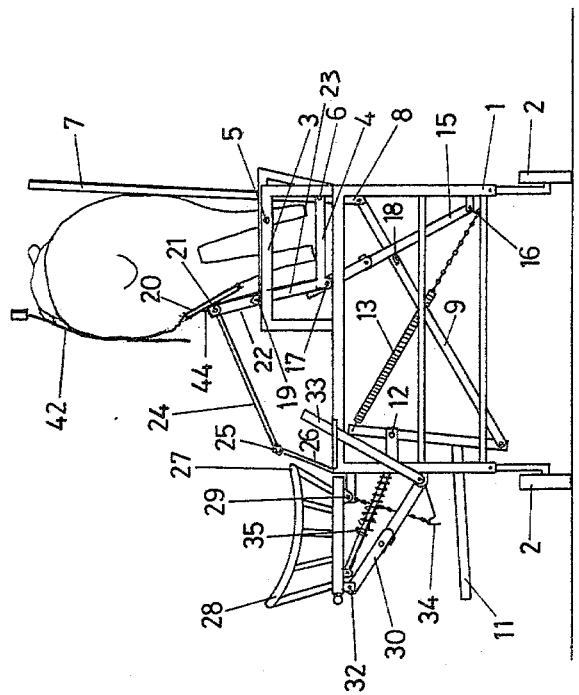
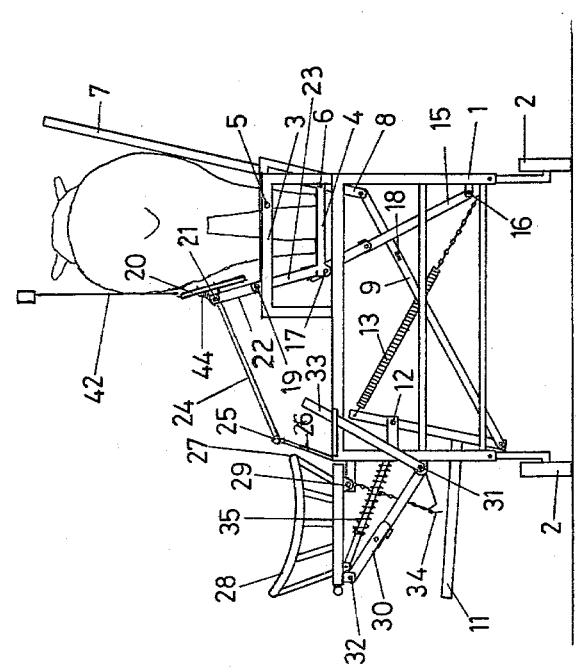

MACHINE FOR CRUTCHING SHEEP AND OTHER ASSOCIATED VETERINARY PURPOSES

BACKGROUND OF THE INVENTION

This invention relates to a machine which is arranged to enable an operator to perform various operations on a sheep such as crutching, mulesing, feet paring, drenching, mouth treatment, classing, vaccinating and the like.

The machine is essentially a device to enable the transfer of the sheep from a standing position in a pen into a cradle where the sheep lies on its back.

Various machines of this general type are already well known and as instances the specification of Australian Pat. No. 237,750 of 1960 can be referred to, which utilizes a holder into which a sheep is driven and this holder is then moved about a horizontal axis to turn the sheep onto its side and if necessary into a partially inverted position.

Another Australian specification is that of Letters Patent No. 248,370 of 1961 in which the sheep is driven from a race into wheel device where it can be laid on its side.

A U.S. Pat. No. 3,752,126 of RHOADES also uses a race and means to swing the animal from the race onto a table about a transverse axis.

The specification of U.S. Pat. No. 3,319,608, KLOOSTER, shows a device which grips and tilts an animal into various positions using a hinge about the animal race and in this device the animal must be lifted first to a horizontal position and it can then be swung over into an inverted position.

The specification of French Pat. No. 2,385,326 shows an arrangement in which an animal is simply gripped in a device and is then rotated into a required position.

SUMMARY OF THE INVENTION

The present invention has as its object the providing of a simple and effective device in which an animal can be taken from a race and placed into a cradle in an inverted position and then subsequently discharged from the cradle, it being a further object to so arrange the mechanism that the animal can be simply placed into its inverted position without the need of having to use excessive force.

The machine according to this invention is basically so arranged that the sheep is caused to fall from a race platform onto a ramp and then into a cradle, the mechanism being arranged to facilitate a rolling action of the sheep over the ramp into the cradle.

In its general construction to achieve the object of simplicity and effective action the machine comprises a race platform supported by hinge means on a frame to be tiltable from a loading position about a longitudinal axis and including a roll plate carried on a connecting strip extending along one longitudinal edge of the race platform at substantial leg height of a sheep, the hinge means being positioned to lower the edge of the race platform when the race platform is tilted to discharge a sheep from the race platform, the frame also supporting a cradle spaced from the race platform to be tiltable about a longitudinal axis, a ramp being disposed between the race platform and the cradle and hinged at one longitudinal edge to the frame adjacent to one upper edge of the cradle and hingedly connected along the opposite edge of the connecting strip adjacent to the roll plate, means being provided to hold the race platform in a loading position but releasable to tilt the race platform to tilt the platform, the arrangement being such that, when the race platform is tilted about the longitudinal axis, a sheep standing on the axis is caused to fall sideways over the roll plate onto the ramp and is rolled over the ramp into the cradle, assisted by the inclination of the ramp increasing as the race platform returns to its loading position.

According to a preferred construction the machine comprises a frame, a race platform adapted to form part of a race along which a sheep can move, pivotal mounting means between the frame and the race platform arranged on a longitudinal axis on the race platform substantially at knee height to a sheep which is standing upright on the race, a first longitudinal wall upstanding along the first side of the race platform, a second lower wall upstanding along the opposite second side of the race platform to locate a sheep between the walls, an upstanding connecting strip hinged at its lower edge to the top of the second wall and having its upper edge substantially at leg height to a sheep standing on the race platform, a ramp hinged at a first longitudinal edge to the upper edge portion of the connecting strip and extending angularly down and having a second opposite longitudinal edge hingedly connected to a support on the frame, a longitudinal roll plate hinged intermediate its longitudinal edges to the top of the connecting strip to tilt independently of the strip and the ramp, spring means engaging the roll plate to urge the roll plate into a substantially vertical position, a cradle tiltable about a longitudinal axis positioned on the frame adjacent to the second edge of the ramp and positioned to receive a sheep rolling down the ramp, lever means on the frame connected to tilt the first wall and the race platform to cause a sheep to be moved sideways by the said wall onto the roll plate and over the roll plate onto the ramp when the lever means are displaced to initiate loading of the cradle, the action lowering the inner hinged edge of the ramp, spring means positioned to return the lever means and the race platform and the connecting strip and to increase the tilt of the ramp when the lever means are released after displacement whereby to assist rolling of the sheep over the ramp as its slope increases to deposit the sheep in the cradle in an upside down position, means to release the cradle to cause it to tilt about the tilting axis to discharge a sheep over the edge of the cradle remote from the tilting axis, and means to return the cradle to its receiving position after discharge of a sheep therefrom.

DESCRIPTION OF THE DRAWINGS

Various other features of the invention will be apparent from the following description which will be made with reference to the accompanying drawings which show a preferred embodiment and in which:

FIG. 2 is an end elevation of the machine showing a sheep in position prior to being loaded into the cradle in an upside down position, FIG. 3 is a corresponding view but showing the longitudinal wall of the device having moved against the sheep to move it over against the roll plate over which it is going to be moved onto the ramp and then into the cradle.

DESCRIPTION OF THE PREFERRED EMBODIMENTS

Figure 1:
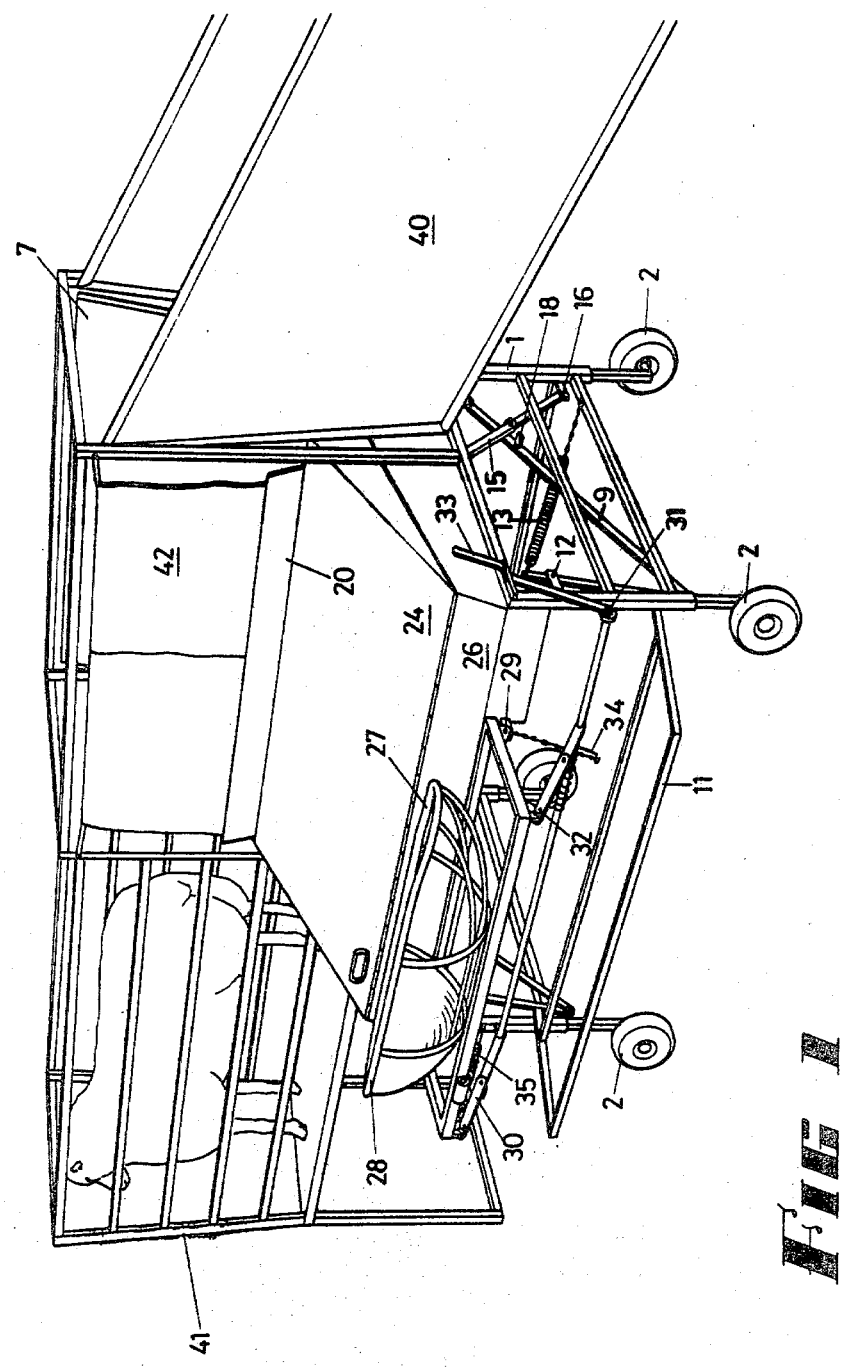
FIG. 1 is a perspective view of a machine in a race showing how a decoy sheep is used to cause a sheep which is to be treated to move onto the race platform prior to being tilted over into the cradle.
Figure 5:
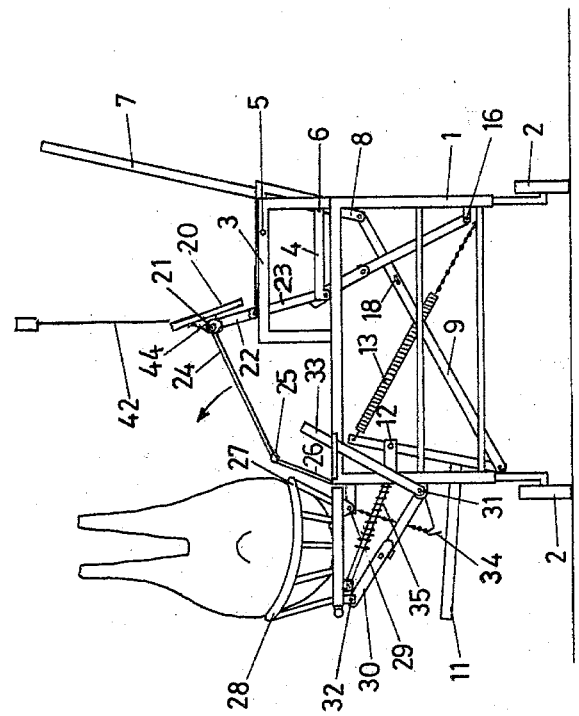
FIG. 5 shows how on release of the pressure from the treadle lever the race platform is returned to its normal position, which as shown raises the roll plate and thus increases the angle of the ramp to assist in continuing to roll the sheep over onto its back in the cradle.
Figure 4:
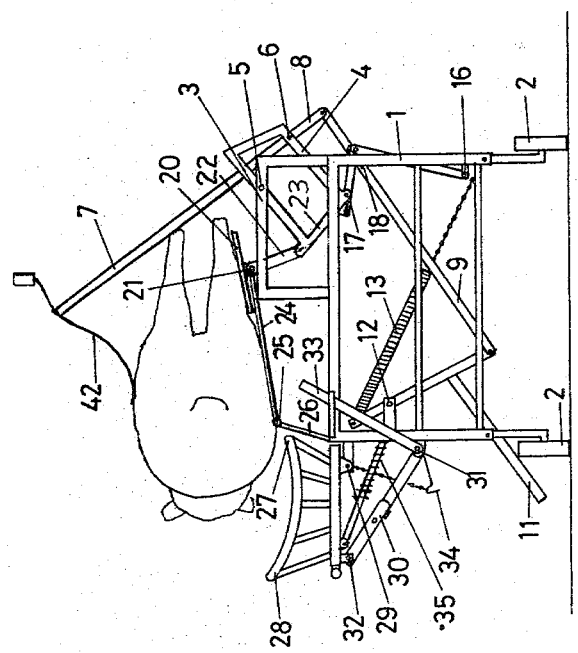
FIG. 4 is again a similar view showing how by continued pressure on a treadle the race platform is tilted to cause the sheep to overbalance and roll over the roll plate onto the ramp.
Figure 6:
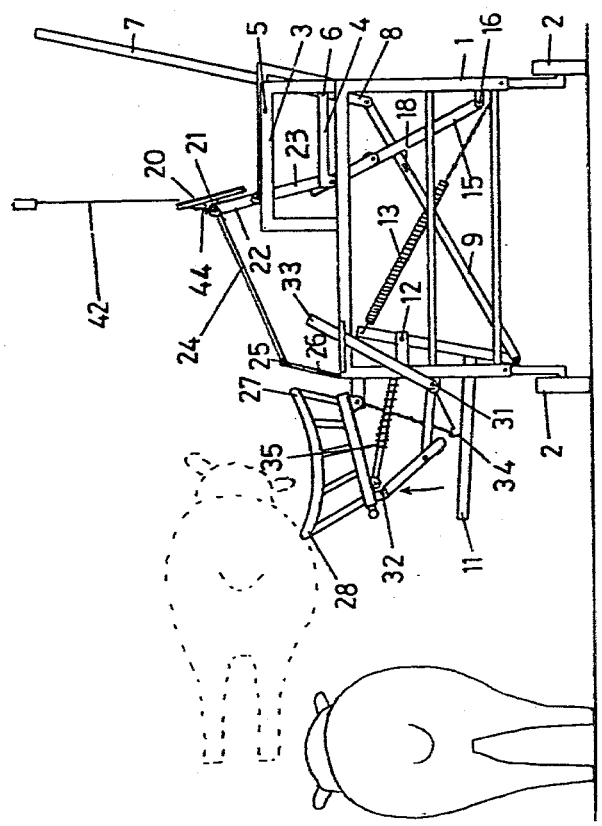
FIG. 6 is a view showing how after treatment the sheep is released by tilting the cradle.
Figure 7:
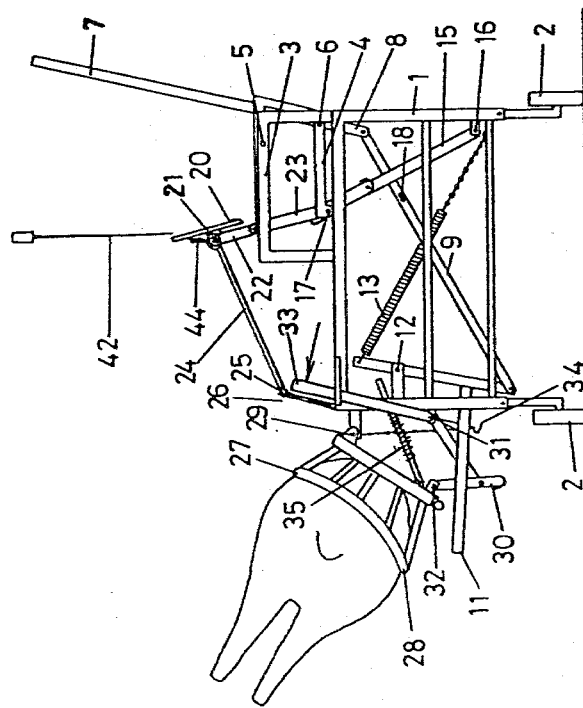
FIG. 7 is a view showing the mechanism returned after the sheep is discharged from the cradle.

The frame 1 is mounted on wheels 2 and has upstanding hock bars 3 at each end of the race platform 4 which is connected to the hock bars by pivots 5, the purpose of the hock bars being to raise the pivotal point to a position where the race platform can be readily tilted and secondly to provide members between which the sheep stands on the race platform 4 after stepping over the hock bar 3 on the entry side and prevent the sheep from backing out.

The race platform 4 incorporates a low wall on one longitudinal edge the other longitudinal edge has connected to it by a longitudinal hinge 6 an upstanding wall 7 which has an extending lever 8 which connects to a link 9 which in turn is pivoted to a treadle lever 10 having a projecting treadle 11 which in turn is connected by a pivot 12 to a bracket on the frame 1 and projects beyond the pivot 12 to engage a return spring 13 the other end of which also connects to the frame 1.

While this assembly is directly coupled so that when the treadle is depressed, the longitudinal wall 7 will be swung inwardly, the race platform 4 is normally held in a horizontal position by means of an over-centre lock bar 15 pivoted at 16 to the frame 1 and at 17 to the race platform, the lock bar normally preventing movement of the race platform 4 about its pivot axis 5, but positioned on the link 9 is a breaker 18 which is positioned to engage the over-centre lock bar 15 as the treadle 11 is further depressed and to move this lock bar out of its lock position and to ensure that the race platform 4 is then free to tilt by collapse of the over-centre lock bar due to the weight of the sheep on the race platform.

On the side of the race platform 4 opposite to that on which the longitudinal wall 7 is mounted is a roll plate 20 which is hinged at 21 to the upper edge of a connecting strip 22 which is itself connected by a hinge 19 at its lower edge to the top of the second wall 23 of the race platform 3, the roll plate 20 being adapted to engage the side of the sheep at about leg height and to identically position all sizes of sheep against the roll plate as it overbalances due to the tilting of the race platform 3 to roll the sheep over squarely onto the ramp 24 which is hinged to the connecting strip 22 at a raised inner end of the ramp, which ramp is in turn hinged by hinging means 25 to a support forming part of the frame 1, the lower edge of the ramp 24 terminating adjacent to the edge 27 of the cradle 28.

The cradle 28 is in turn connected by a hinge 29 to a bracket on the frame 1 and extends outwardly to be supported at the outer end by a second over-centre lock bar 30 hinged at one end to a shaft 31 supported in bearings on the main frame 1 and connected at the other end by a pivot 32 to the free end of the cradle 28, the shaft 31 having on it an operating handle 33 whereby the over-centre lock bar 30 can be moved to its unlocked position to allow the cradle to swing down to discharge a sheep, a torsion spring 34 around the shaft 31 normally holding the lock bar 30 in its locked position.

The cradle has attached between it and the frame 1 a torsion spring 34 which normally holds the cradle 28 in its raised position but the weight of a sheep is sufficient to compress this torsion spring when the over-centre lock bar 30 is moved to its release position by actuating the handle 33 to allow the cradle to swing down about the hinge 29, dropping the cradle down onto a pressure spring 35 which compresses to a degree commensurate with the weight of the sheep then extends to give a differential lift to one side of the sheep to roll it onto its feet. When the sheep rolls from the cradle onto its feet the torsion spring 34 will reposition the cradle for the next operation and the lock bar 30 will also reposition due to the torsion spring 34 into a locked arrangement.

The machine just described can be placed into position between an entry part of a race 40 and a decoy-holding part of the race 41 and a cloth, or similar screen, 42 is positioned above the support member 20 so that a sheep moving through the entry part 40 of the race toward the decoy sheep in the decoy holding part 41 does not see to either side of the race because of the cloth screen on the one side and the longitudinal upstanding wall along the other side.

The sheep of course will step over the hock bar 3 as it moves from the entry part 40 of the race onto the race platform 4 itself and this helps to ensure that the sheep will be correctly located within the pen formed by the two hock bars and the longitudinal wall and the support member and screen, and when the sheep requires to be inverted into the cradle it is then only necessary to operate the treadle 11 to first move the longitudinal wall 7 inwards to urge the sheep against the roll plate 20 which has a torsion spring 44 between it and the connecting strip 22 which positions it substantially vertically in readiness to engage the side of the sheep at about the level of the body at or just above the top of the legs, and, as explained earlier, once the sheep has been moved against the roll plate 20 and the race platform 4 is tilted by movement of the link 18 through the treadle 10 and the consequent collapse of the over-centre lock bar 15, the sheep simply falls onto the roll plate 20 and rolls over it onto the ramp 24 which at that stage has a lower angle but as soon as the sheep rolls onto this ramp 24 the weight is largely transferred directly to the main frame because of the connection of the ramp 24 to the frame 2 through the hinge 25 and thus with pressure released from the treadle 10 the ramp continues to fall until the weight of the sheep on the ramp 24 is counterbalanced by the spring 13 positioned between the treadle lever 11 through the link 9 which then returns the race platform 4 back oto its normal horizontal position with the longitudinal wall 7 being then again repositioned outwardly, as shown particularly in FIG. 2, and the over-centre lock bar 15 back in its lock position is also shown in that Figure. This action is gentle on the sheep as it avoids dropping them onto a fixed platform which could cause damage to the sheep particularly pregnant ewes.

It will be of interest to note that the rolling action of the sheep into the cradle proceeds in a very simple manner in that, as the race platform 4 moves about the pivot 5 into its sideways tilting position, the sheep overbalances onto the longitudinal roll plate 20 which as it is hinged allows the sheep to continue over until it rests on the ramp 24 which at that stage is at a lower angle about its hinging means 25 but at this stage partly due to the transfer of the weight of the sheep and removal of pressure from the treadle 11, which was not required after the over-centre lock bar 15 had been collapsed due to the weight of the sheep then being on that side of the race platform 4, the spring 13 returns the race platform 4 to its normal position and this action of course moves the support member 20 upwardly and this increases the angle of the ramp 24 to ensure that the sheep continues to roll over the ramp and into the cradle 28.

It will be realised with this device that the race platform 4 is returned to its receiving position as soon as the sheep has been transferred to the cradle so that the next sheep moves into position behind the decoy sheep in readiness for when the sheep in the cradle is discharged to the ground, thus effecting considerable time saving in operation.

It will be realised of course that although the machine has been described for the treatment of sheep, that it is not necessarily limited to this purpose because other animals can be similarly handled by it, although it has been specially designed for sheep which usually require to be handled in large numbers and it is thus important to have a machine into which the sheep can be easily moved and which will invert them into a cradle to subsequently discharge them from the cradle with a minimum of effort, and it will be seen that the present machine in view of the balance requires minimum force for the handling of the sheep mainly because the race platform is hinged to the frame at a height corresponding roughly to the knee height of the sheep and the pivoting means between the race platform and the hock bars can be moved to a convenient location along the hock bars which will ensure that the weight of the sheep in the pen formed above the race platform 4 will provide the required loading against spring pressure to cause the sheep to be rolled over onto its back via the ramp 24 under guidance of the support member 20.

It will be noted also that the machine is particularly useful for any shearing operation or similar on sheep, goats or other animals where it is required to first position the animal into a cradle or other holding position ready for the shearing or other operation to be performed.

Variation of the mechanism within the spirit of the invention will of course be possible.

I claim:

1. A machine for crutching sheep and for other associated veterinary purposes wherein a sheep is moved on a race and is discharged from the race into an adjacent cradle in an inverted position and after treatement is discharged from the cradle by again inverting it, characterised by:
    (a) a race platform supported by hinge means on a frame to be tiltable from a loading position about a longitudinal axis and including a roll plate carried on a connecting strip extending along one longitudinal edge of the said race platform at substantially leg height of a sheep, said hinge means being positioned to lower the said edge of the race platform when the said race platform is tilted to discharge a sheep from the said race platform,
    (b) a cradle also supported on the said frame but spaced from the said race platform to be tiltable about a longitudinal axis,
    (c) a ramp disposed between the said race platform and the said cradle hingedly connected at one longitudinal edge to the said frame adjacent to one upper edge of the said cradle and hingedly connected along the opposite edge to the said connecting strip adjacent to the said roll plate, and
    (d) means to hold the said race platform in a loading position but releasable to tilt the said race platform whereby when said race platform is tilted about the said longitudinal axis a sheep standing on the said race platform is caused to fall sideways over the said roll plate onto the said ramp and is rolled over the said ramp into the said cradle assisted by the increasing inclination of the said ramp as the said race platform returns to its loading position.

2. A machine according to claim 1 characterised in that the said race platform is hinged to the said frame by longitudinal hinge means disposed toward the opposite edge of the said race platform to the said roll plate and at a height above the said platform equal substantially to knee height of a sheep, whereby the weight of a sheep tends to tilt the said platform when released and simultaneously to decrease the angle of the said ramp.

3. A machine according to claim 1 characterised by a pair of hock bars upstanding from the said frame one at each end of the said race platform and to project across the said race platform to form guides to urge a sheep into position and retain it there after stepping over the one said hock bar, the said pivotal mounting means between the said frame and the said race platform being supported from the said hock bars.

4. A machine according to claim 1 wherein the said roll plate is longitudinally hinged to the said connecting strip and is spring-loaded to normally lie parallel to the plane of the said connecting strip but orientates when a sheep overbalances when pushed by movement of the said first wall and the tilting of the said race platform.

5. A machine according to claim 1 wherein the said cradle is supported in a receiving and holding position by an over-centre lock bar hingedly connected respectively to the said frame and to the said cradle remote from its pivotal connection to the said frame, means to move the said lock bar to an unlocked position to allow the weight of a sheep on the cradle to tilt the said cradle to discharge the sheep, and spring means between the said frame and the said cradle to urge the cradle to return to its receiving and holding position when not holding a sheep.

6. A machine according to claim 1 characterised by an upstanding wall on said race platform on the longitudinal edge of the said race platform opposite to the said roll plate and by lever means on the said frame connected to tilt the said race platform and the said wall to cause a sheep on the said race platform to be tilted sideways by the said wall to overbalance over the said roll plate onto the said ramp.

7. A machine according to claim 6 characterised in that the said upstanding wall is connected to the said lever means to be displaced thereby, and in that the said race platform is held in a sheep-receiving position by an over-centre lock bar connected between the said race platform and the said frame releasable by a breaker on the said lever means which effects release after the said wall has been moved part way, the said longitudinal axis of the said race platform being positioned to cause the said platform when loaded by a sheep to over-balance when the said lock bar is released by the said breaker.

8. A machine according to claim 1 wherein the longitudinal wall upstanding along the first side of the said race platform is hingedly connected along a longitudinal axis to the said race platform and is coupled to the said lever system to commence to tilt before the race platform tilts but continued tilt of the longitudinal wall causes the race platform to tilt also.

9. A machine according to claim 8 wherein the said lever means comprise a lever having a treadle on it pivoted to the said frame and connected by a link to the said longitudinal wall, and wherein the said race platform is normally held in its sheep-receiving position by an articulated over-centre lock bar hinged at one end to the said frame and at the other end to the said race platform remote from the pivotal mounting means between the said frame and the said race platform, and wherein the said link includes a breaker which after some movement of the said wall engages the lock bar to move it from its over-centre position to cause the race platform to tilt with the said hinged wall.

10. A machine for crutching sheep and other associated veterinary purposes comprising in combination, a frame, a race platform adapted to receive a sheep, pivotal mounting means between the said frame and the said race platform arranged on a longitudinal axis on the said race platform substantially at knee height to a sheep standing upright on the said race platform, a longitudinal wall upstanding along a first side of the said race platform a roll bar supported on a connecting strip upstanding along the opposite second side of the said race platform to confine a sheep between the said wall and the said roll bar, the said roll bar being substantially at leg height of a sheep and hingedly connected at its lower end to a second wall on the said race platform positioned on the opposite side to the said first wall, a cradle tiltable about an axis parallel to the first said axis mounted on the said frame remotely from the said race platform on the support member side thereof and adapted to receive a sheep, a ramp disposed between the said race platform and the said cradle hingedly connected at one edge to the upper part of the said connecting strip and extending angularly downward to the upper edge of that side of the cradle which is nearest to the said race platform and hingedly connected to the said frame, lever means on the said frame connected to tilt the said race platform and the said first wall and the said connecting strip and roll bar to cause a sheep to be tilted sideways by the said first wall onto the said roll bar and over the said roll bar onto the said ramp when the said lever means are displaced to initiate loading of the cradle, said action lowering the inner hinged edge of the said ramp, means positioned to return the said lever means and the said race platform and the said connecting strip and roll bar and the said ramp when the said lever means are released after displacement whereby to assist rolling of the sheep over the said platform as its slope increases to deposit the sheep in the said cradle in an inverted position, means to release the cradle to cause it to tilt about the said tilting axis to discharge a sheep over the edge of the cradle remote from the tilting axis, and means to return the said cradle to its receiving position after discharge of a sheep therefrom.

* * * * *

UNITED STATES PATENT AND TRADEMARK OFFICE
CERTIFICATE OF CORRECTION

PATENT NO. : 4,309,964
DATED : January 12, 1982
INVENTOR(S) : Henry S. C. Young

It is certified that error appears in the above-identified patent and that said Letters Patent is hereby corrected as shown below:

On The Title Page, add

-- (73) Assignee: Henry Young & Sons Pty. Ltd.,

Keith, South Australia --.

Signed and Sealed this

Twenty-sixth Day of October 1982

[SEAL]

Attest:

GERALD J. MOSSINGHOFF

Attesting Officer   Commissioner of Patents and Trademarks